United States Patent
Fukuda et al.

(10) Patent No.: US 10,198,058 B2
(45) Date of Patent: Feb. 5, 2019

(54) ARITHMETIC OPERATION DEVICE AND CONTROL APPARATUS FOR CONTROL POWER SUPPLY OF ARITHMETIC OPERATION DEVICE

(71) Applicant: OMRON Corporation, Kyoto (JP)

(72) Inventors: Yasunori Fukuda, Moriyama (JP); Masaichi Takai, Ritto (JP); Shigeyuki Eguchi, Joyo (JP); Yasuhiro Nishimura, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/705,276

(22) Filed: Sep. 15, 2017

(65) Prior Publication Data

US 2018/0101381 A1 Apr. 12, 2018

(30) Foreign Application Priority Data

Oct. 7, 2016 (JP) .................................. 2016-199582

(51) Int. Cl.
  *G06F 1/32* (2006.01)
  *G05B 19/05* (2006.01)

(52) U.S. Cl.
  CPC ......... *G06F 1/3206* (2013.01); *G05B 19/058* (2013.01); *G06F 1/32* (2013.01);
  (Continued)

(58) Field of Classification Search
  CPC ........ G06F 1/32; G06F 1/3203; G06F 1/3206; G06F 1/325; G06F 1/3287
  See application file for complete search history.

(56) References Cited

U.S. PATENT DOCUMENTS

| | | | |
|---|---|---|---|
| 2008/0082850 A1* | 4/2008 | Otsuka | G06F 11/30 713/340 |
| 2008/0197703 A1* | 8/2008 | Tomita | G06F 1/3203 307/31 |
| 2018/0101383 A1* | 4/2018 | Fukuda | G06F 9/30145 |

FOREIGN PATENT DOCUMENTS

| | | |
|---|---|---|
| EP | 1857900 | 11/2007 |
| EP | 2816428 | 12/2014 |

(Continued)

OTHER PUBLICATIONS

"Search Report of Europe Counterpart Application", dated Feb. 28, 2018, p. 1-p. 10.

*Primary Examiner* — Glenn A. Auve
(74) *Attorney, Agent, or Firm* — JCIPRNET

(57) ABSTRACT

An arithmetic operation device configuring a control apparatus includes: a communication circuit that is used for exchanging data with functional units through a communication line; a processor that is used for executing a user program executing at least one of an arithmetic operation process using data acquired from the functional units and a generating process of data to be transmitted to the functional units; and a monitoring circuit that is connected to the communication circuit and the processor. The monitoring circuit gives a notification from the communication circuit to the functional units on the basis of at least one of detection of shutoff of power supplied to the arithmetic operation device and reception of a preliminary notification before the shutoff of the power supplied to the arithmetic operation device, and the notification is used for executing a process according to shutoff of power supply to the arithmetic operation device.

10 Claims, 7 Drawing Sheets

(52) U.S. Cl.
CPC ............ *G06F 1/3203* (2013.01); *G06F 1/325* (2013.01); *G06F 1/3287* (2013.01)

(56) References Cited

FOREIGN PATENT DOCUMENTS

JP      S58106602      6/1983
JP      2009-146168    7/2009

* cited by examiner

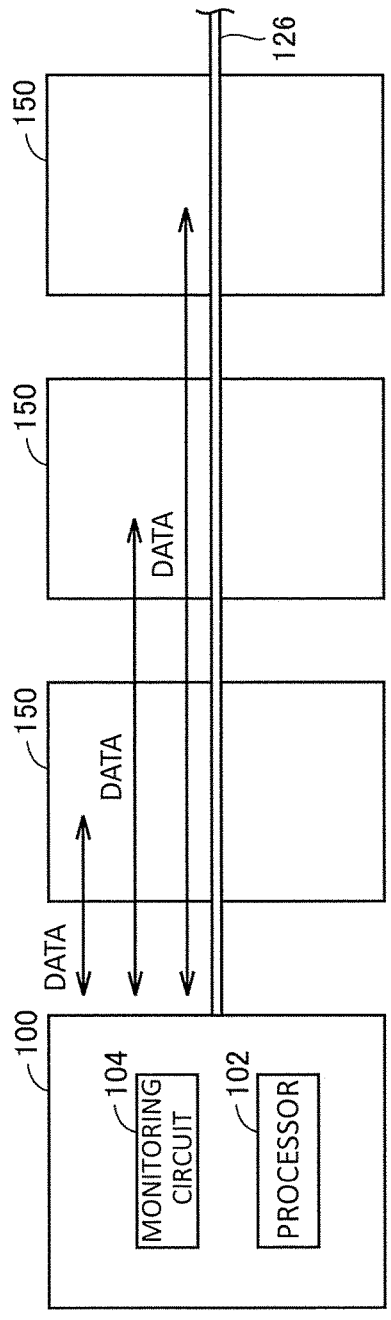
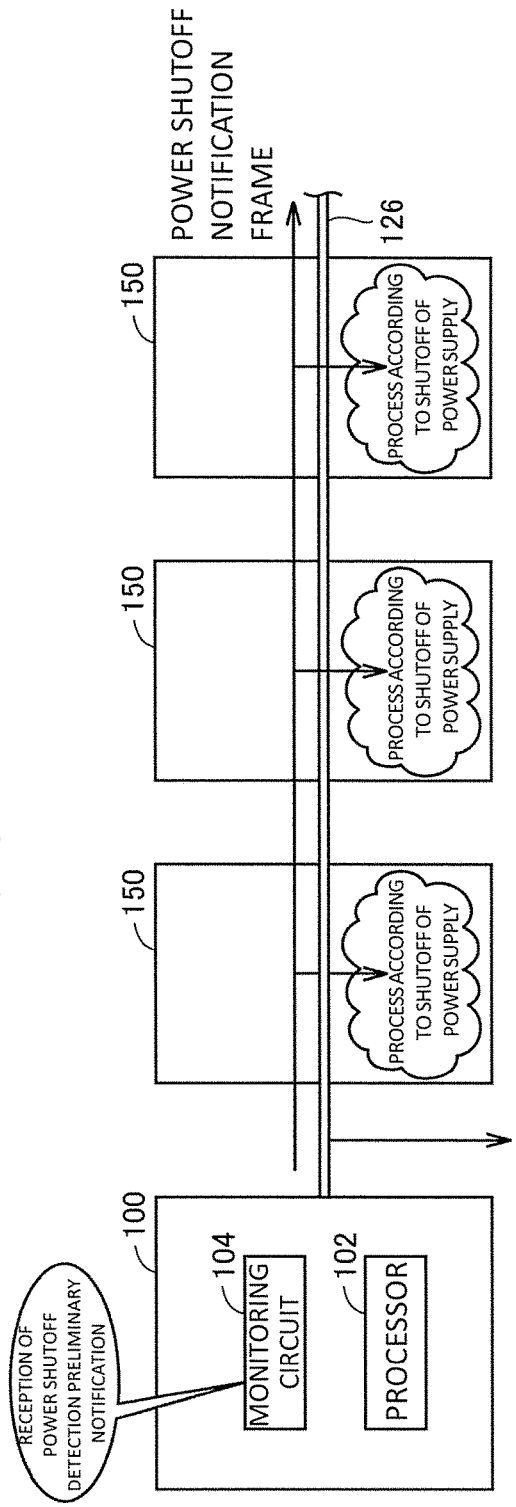

ARITHMETIC OPERATION DEVICE AND CONTROL APPARATUS FOR CONTROL POWER SUPPLY OF ARITHMETIC OPERATION DEVICE

CROSS-REFERENCE TO RELATED APPLICATION

This application claims the priority benefit of Japan application serial no. 2016-199582, filed on Oct. 7, 2016. The entirety of the above-mentioned patent application is hereby incorporated by reference herein and made a part of this specification.

BACKGROUND OF THE INVENTION

Field of the Invention

The present invention relates to an arithmetic operation device configuring a control apparatus including one or a plurality of functional units and the control apparatus.

Description of Related Art

As major components used for realizing various kinds of factory automation (FA), control apparatuses such as programmable controllers (PLC) are widely used. Such control apparatuses, in order to perform centralized control of operations of various machines and facilities, need to have fault tolerance for continuously performing a control operation despite certain faults, abnormalities, or the like occurring, a fail-safe function for safely stopping a machine or a facility that is a control target, and the like.

For example, in Japanese Unexamined Patent Application Publication No. 2009-146168 (Patent Document 1), a component mounting substrate for a PLC capable of responding to IO memory specifications provided with a backup function and IO memory specifications provided with an ECC function for improving the reliability at the time of power shutdown at a low cost is disclosed.

PRIOR ART DOCUMENT

Patent Documents

[Patent Document 1] Japanese Unexamined Patent Application Publication No. 2009-146168

SUMMARY OF THE INVENTION

A control apparatus such as a PLC includes various functional units such as an input/output unit, a counter unit, and a temperature adjusting unit. Such functional units may be either directly connected to an arithmetic operation device (also referred to as a central processing unit (CPU)) executing a user program or the like or connected to the arithmetic operation device through a field network or the like.

When the power supplied to the arithmetic operation device is shut off, a user program cannot be normally executed. Thus, a process according to the shut-off of power supplied to the arithmetic operation device in which output signals for the functional units connected to the arithmetic operation device are also configured to have safe values is necessary.

An object of the present invention is to provide a new configuration for causing a functional unit to execute a corresponding process when power supplied to an arithmetic operation device is shut off.

According to one aspect of the present invention, there is provided an arithmetic operation device configuring a control apparatus, the arithmetic operation device includes: a communication circuit that is used for exchanging data with one or a plurality of functional units through a communication line; a processor that is used for executing a user program executing at least one of an arithmetic operation process using data acquired from the one or the plurality of functional units and a generating process of data to be transmitted to the one or the plurality of functional units; and a monitoring circuit that is connected to the communication circuit and the processor. The monitoring circuit receives at least one of shutoff of power supplied to the arithmetic operation device and a preliminary notification of shutoff of the power supplied to the arithmetic operation device, and gives a notification used for executing a process according to shutoff of power supplied to the arithmetic operation device from the communication circuit to the one or the plurality of functional units.

The process according to the shutoff of the power supply to the arithmetic operation device may include a transition to an operation state in which an operation of each functional unit is limited.

A specific frame including a command associated with the process according to the shutoff of the power supply to the arithmetic operation device may be transmitted from the communication circuit through the communication line, and specific frames may be sequentially transmitted to the one or the plurality of functional units.

When the specific frame is received, each of the one or the plurality of functional units may change a value of a flag representing an operation state.

The processor may pre-register the specific frame transmitted from the communication circuit before start of execution of the user program by executing a program.

The monitoring circuit may shut off power consumption of the communication circuit after the transmission of the specific frame.

The arithmetic operation device may further include a power supply section that supplies power to the arithmetic operation device, and the monitoring circuit may detect shutoff of power on the basis of a supply state of an external power supply for the power supply section.

The arithmetic operation device may further include a power supply section that supplies power to the arithmetic operation device, and the monitoring circuit may receive the preliminary notification from an UPS device supplying an external power to the power supply section.

The monitoring circuit may be implemented using an FPGA or an ASIC.

According to another aspect of the present invention, there is provided a control apparatus including: an arithmetic operation device; and one or a plurality of functional units. The arithmetic operation device includes: a communication circuit that is used for exchanging data with the one or the plurality of functional units through a communication line; a processor that is used for executing a user program executing at least one of an arithmetic operation process using data acquired from the one or the plurality of functional units and a generating process of data to be transmitted to the one or the plurality of functional units; and a monitoring circuit that is connected to the communication circuit and the processor. The monitoring circuit receives at least one of shutoff of power supplied to the arithmetic operation device and a preliminary notification of shutoff of the power supplied to the arithmetic operation device, and gives a notification used for executing a process according to shutoff of power supply to the arithmetic operation device from the communication circuit to the one or the plurality of functional units.

According to the present invention, a simpler configuration for causing a functional unit to execute a corresponding process at the time of shutting off power supplied to an arithmetic operation device can be realized.

BRIEF DESCRIPTION OF THE DRAWINGS

FIGS. 3A and 3B are schematic views describing an overview of a power shutoff process in a PLC according to this embodiment.

DESCRIPTION OF THE EMBODIMENTS

Figure 1:
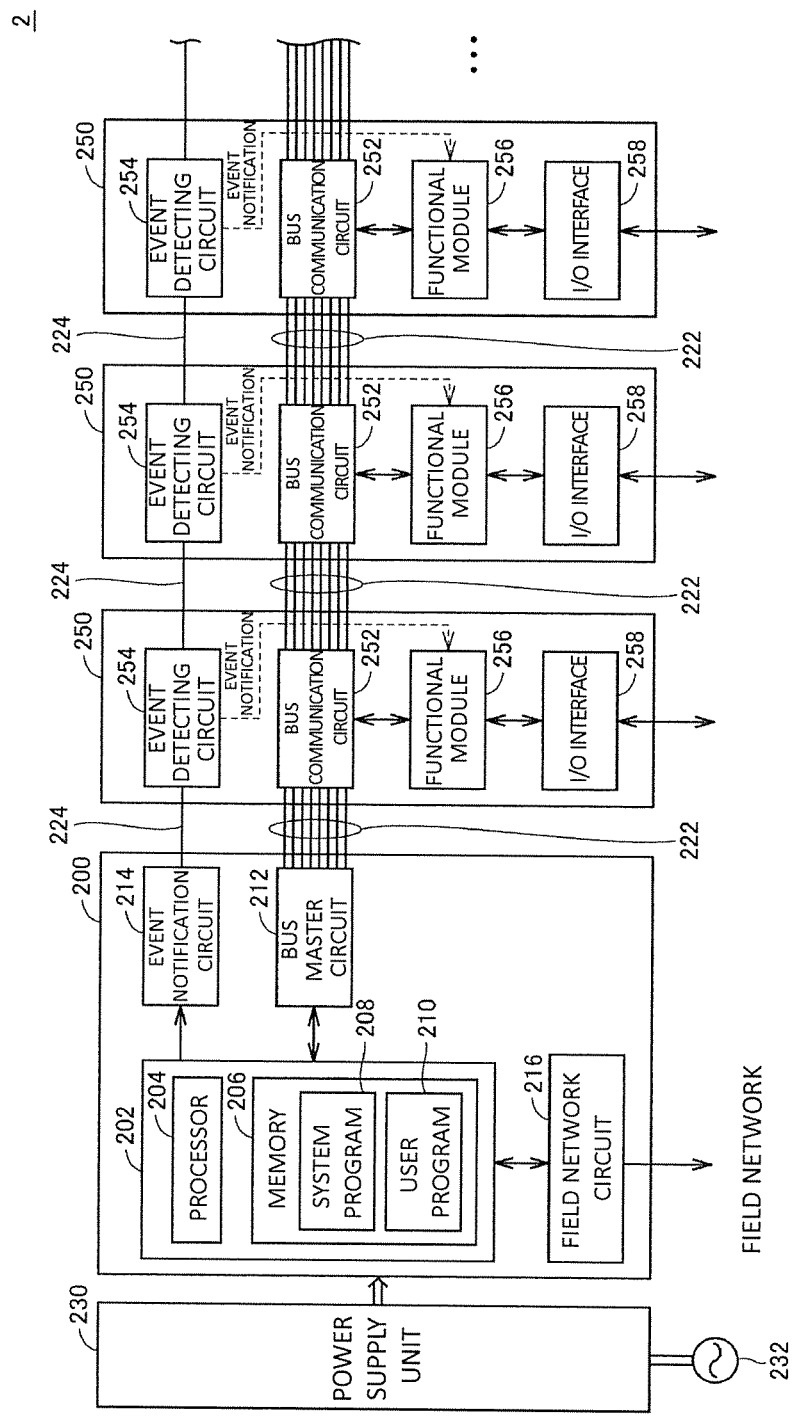
FIG. 1 is a schematic view illustrating the configuration of a main part of a PLC according to a related technology of the present invention.

An embodiment of the present invention will be described in detail with reference to the drawings. In the drawings, the same reference numerals are assigned to the same portions or corresponding portions, and description thereof will not be presented.

In the following description, while a programmable controller (PLC) will be described as a specific example as a typical example of a "control apparatus", the technical idea disclosed here can be applied to an arbitrary control apparatus without being limiting to the name "PLC".

<A. Related Technology>

First, technologies relating to a control apparatus according to this embodiment will be described.

FIG. 1 is a schematic view illustrating the configuration of a main part of a PLC according to a related technology of the present invention. As illustrated in FIG. 1, a PLC 2 according to a related technology of the present invention, typically, includes a power supply unit 230, a CPU unit 200, and one or a plurality of functional units 250.

The power supply unit 230 receives supply of power from an external power supply 232 such as a commercial power supply, converts the received power into a predetermined voltage, and then, supplies the converted power to the CPU unit 200 and the like. Typically, AC power of 100 V to 240 V is input to the power supply unit 230, and DC power of 5 V is supplied to the CPU unit 200 and the like.

The functional unit 250 provides various functions for realizing control of various machines and facilities using the PLC 2.

The CPU unit 200 is one element configuring the PLC 2 and corresponds to an arithmetic operation device controlling the overall process of the PLC 2. The CPU unit 200 includes an arithmetic operation processing unit 202, a bus master circuit 212, an event notification circuit 214, and a field network circuit 216.

The arithmetic operation processing unit 202 includes a processor 204 used for executing the user program and a memory 206 storing the system program 208, the user program 210, and the like. The processor 204 executes various programs including the system program 208 and the user program 210.

The bus master circuit 212 is a communication circuit used for exchanging data with one or a plurality of functional units 250 through an internal bus 222. The field network circuit 216 is a communication circuit relaying exchange of data with other PLCs, a remote input output (I/O) device, functional units, and the like through a field network. The event notification circuit 214 is a communication circuit used for notifying an event to one or a plurality of the functional units 250 through a dedicated line 224 when the event occurs.

Each of the functional units 250 includes a path communication circuit 252, an event detecting circuit 254, a functional module 256, and an I/O interface 258.

The path communication circuit 252 exchanges data with the bus master circuit 212 of the CPU unit 200 through the internal bus 222. More specifically, the path communication circuit 252 transmits data (hereinafter, also referred to as "input data") collected or generated by the functional unit 250 to the CPU unit 200 at a timing designated by the bus master circuit 212 of the CPU unit 200 and receives data (hereinafter, also referred to as "output data") acquired or generated by the CPU unit 200 from the CPU unit 200. The output data corresponds to an instruction value given to a machine, a facility, or the like that is a control target.

The functional module 256 is a part that executes a main process of each functional unit 250 and is responsible for collection of field information from a machine, a facility, or the like that is a control target, output of an instruction signal to a machine, a facility, or the like that is a control target, and the like. The I/O interface 258 is a circuit that relays the exchange of a signal with a machine, a facility, or the like that is a control target.

The event detecting circuit 254 is a circuit that monitors event notifications from the event notification circuit 214 of the CPU unit 200 and, when an event notification is received, outputs the event notification to the functional module 256.

The event notification circuit 214 of the CPU unit 200, the event detecting circuit 254 of the functional unit 250, and the dedicated line 224 are components used for notifying an arbitrary event detected by the CPU unit 200 to the functional unit 250. For example, when power supplied to the CPU unit 200 is shut off, an event representing the power shutoff is notified to the functional unit 250. Each functional unit 250 receives the event notification and executes a process according to the shutoff of the power supply to the CPU unit 200.

In this way, in the PLC 2 illustrated in FIG. 1, when the supply of power to the CPU unit 200 is shut off, the power shutoff is notified to one or a plurality of functional units 250 connected to the CPU unit 200 while power supply using remaining power is maintained. According to the notification of the power shutoff, each functional unit 250 can instantaneously execute a necessary process.

While such an event notification from the CPU unit 200 is effective for operation and maintenance, in the PLC 2 illustrated in FIG. 1, in order to transmit such an event notification, the dedicated line 224 is necessary, which is disadvantageous in terms of the cost. Thus, it is preferable to employ a control apparatus according to this embodiment to be described below.

<B. Apparatus Configuration>

The apparatus configuration of the PLC according to this embodiment will be described.

Figure 2:
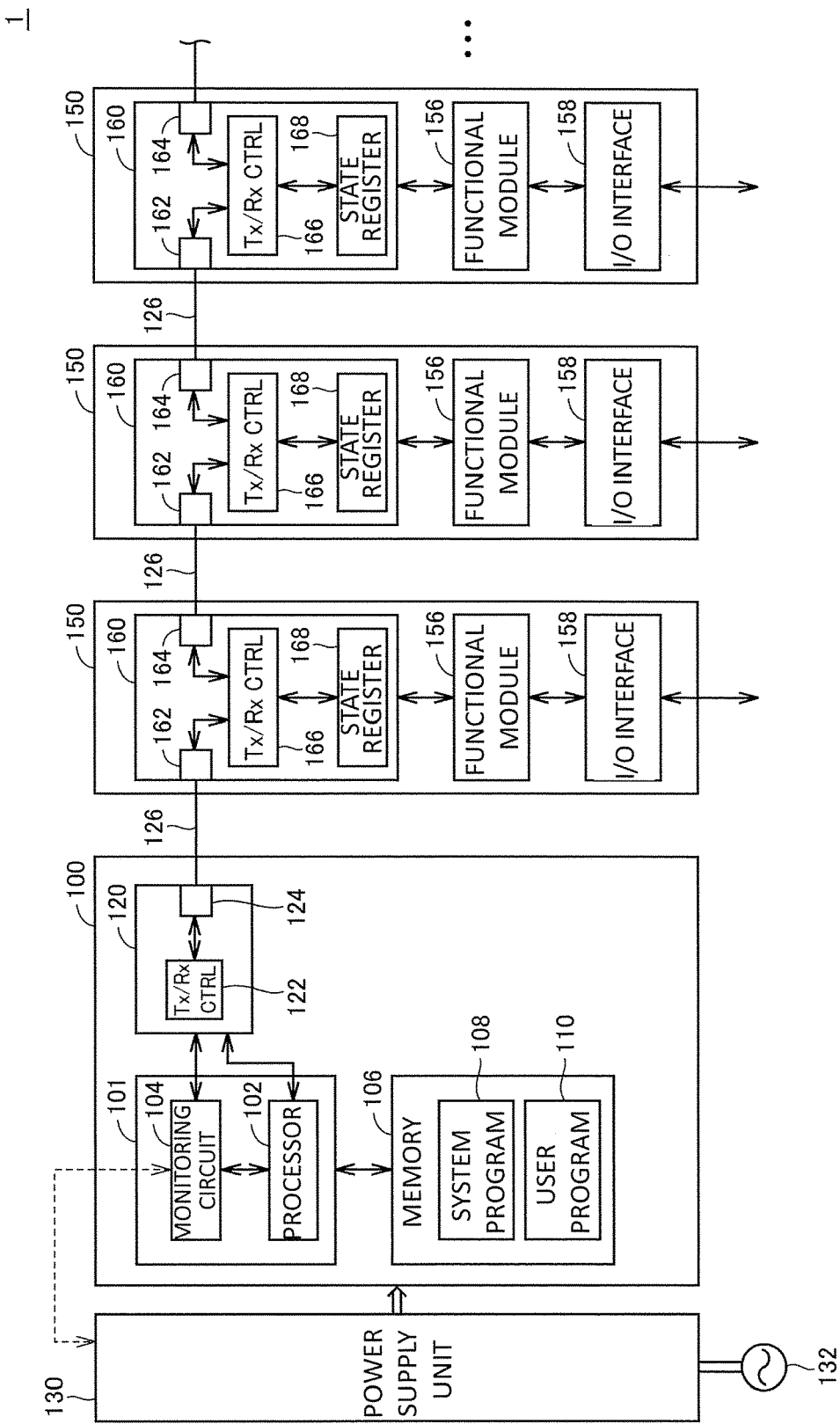
FIG. 2 is a schematic view illustrating the configuration of a main part of a PLC according to this embodiment.

FIG. 2 is a schematic view illustrating the configuration of a main part of a PLC according to this embodiment. As illustrated in FIG. 2, the PLC 1 according to this embodiment, typically, includes a power supply unit 130, a CPU unit 100, and one or a plurality of functional units 150. The CPU unit 100 and one or a plurality of the functional units 150 are connected through a local network 126 that is an example of a communication line.

The power supply unit 130 is a power supply section that supplies power to the CPU unit 100 and the like, receives the supply of power from an external power supply 132 such as a commercial power supply, converts the supplied power into a predetermined voltage, and then, supplies the power to the CPU unit 100 and the like. Typically, AC power of 100 V to 240 V is input to the power supply unit 130, and DC power of 5 V is supplied to the CPU unit 100 and the like.

The functional units 150 provide various functions for realizing control of various machines and facilities using the PLC 1 and, typically, may include an I/O unit, a communication unit, a temperature adjusting unit, an identifier (ID) sensor unit, and the like.

Examples of the I/O unit include a digital input (DI) unit, a digital output unit (DO) unit, an analog input (AI) unit, an analog output (AO) unit, a pulse catch input unit, and a multiple unit mixing a plurality of types of unit.

The communication unit relays exchange of data with another PLC, a remote I/O device, functional units, and the like and, for example, may include a communication device or the like relating to any one of protocols such as EtherCAT (registered trademark), EtherNet/IP (registered trademark), DeviceNet (registered trademark), CompoNet (registered trademark), and the like.

The temperature adjusting unit is a control device including an analog input function acquiring temperature measurement values and the like, an analog output function outputting a control instruction and the like, and a proportional integral differential (PID) control function. The ID sensor unit is a device that reads data from a radio frequency identifier (RFID) or the like in a non-contact manner.

The CPU unit 100 is one element configuring the PLC 1 and corresponds to an arithmetic operation device controlling the overall process of the PLC 1. The CPU unit 100 includes an arithmetic operation processing unit 101, a memory 106, and a communication master circuit 120.

The arithmetic operation processing unit 101 includes a processor 102 and a monitoring circuit 104. For the convenience of description, while only the processor 102 is illustrated in FIG. 2, a plurality of processors may be implemented. In addition, each processor may include a plurality of cores. The monitoring circuit 104 has a hard-wired configuration at least for a main part and realizes a process with a higher speed than that of the processor 102. In other words, the monitoring circuit 104 is realized using hardware logics. For example, the monitoring circuit 104 may be implemented using a field-programmable gate array (FPGA) that is an example of a programmable logic device (PLD), an application specific integrated circuit (ASIC) that is an example of an integrated circuit (IC), or the like.

In the configuration illustrated in FIG. 2, the arithmetic operation processing unit 101 includes a system-on-chip (SoC) in which the processor 102 and the monitoring circuit 104 are implemented on the same chip. However, the configuration is not limited thereto. Thus, the processor 102 and the monitoring circuit 104 may be implemented on different chips, or at least a part of the memory 106 and the communication master circuit 120 may also be implemented on the same chip.

The memory 106 includes a portion (typically, a volatile memory) providing a work area that is necessary for the execution of a program in the processor 102 and a portion (typically, a nonvolatile memory) storing a program executed by the processor 102. As the volatile memory, a dynamic random access memory (DRAM), a static random access memory (SRAM), or the like may be used. As the nonvolatile memory, a flash memory, a hard disk, or the like may be used.

The memory 106 stores a system program 108, a user program 110, and the like. The system program 108 includes an operating system (OS), a library, and the like used for the processor 102 to execute the user program 110. The user program 110, typically, is a group of commands for executing at least one of an arithmetic operation process (for example, a logical operation or a numerical value calculation) using data (input data) acquired from one or a plurality of the functional units 150 and a generating process of data (output data) to be transmitted to one or a plurality of the functional units 150 and is arbitrarily generated according to a machine or a facility that is a control target. When the processor 102 executes the user program 110, control of a facility, a device, or the like using the PLC 1 is realized.

The monitoring circuit 104 is connected to the processor 102 and the communication master circuit 120 and, as will be described later, when the power supply to the CPU unit 100 is shut off, notifies each of the one or the plurality of functional units 150 of the shutoff of the power supply. Details of the process executed in this monitoring circuit 104 will be described later.

In the PLC 1 according to this embodiment, the local network 126 is one kind of fixed-period network, and, under the control of the communication mater circuit 120 of the CPU unit 100, each of one or a plurality of the functional units 150 repeats transmission of input data to the CPU unit 100 and reception of output data from the CPU unit 100 for each of predetermined periods. In this way, the communication master circuit 120 exchanges data (the input data and the output data) with one or a plurality of functional units 150 through the local network 126 that is communication line.

As such a fixed-period network, a network relating to one of known protocols such as EtherCAT (registered trademark), EtherNet/IP (registered trademark), DeviceNet (registered trademark), or CompoNet (registered trademark) may be employed.

In the PLC 1 according to this embodiment, on the local network 126, frames having a data structure set in advance are sequentially transmitted in a predetermined period, and the CPU unit 100 and each functional unit 150, for the sequentially-transmitted frames, record designated data in each designated area and read necessary data from corresponding areas.

The communication master circuit 120 includes a transmission/reception controller 122 and a transmission/reception port 124. The transmission/reception port 124 is a part that is physically connected to the local network 126, generates an electric signal in accordance with an instruction from the transmission/reception controller 122 and transmits the generated electric signal onto the local network 126, and converts an electric signal generated on the local network 126 into a digital signal and outputs the converted digital signal to the transmission/reception controller 122. In addition to the exchange of data through the local network 126, the transmission/reception controller 122 executes timing management for guaranteeing the arrival time of data transmitted on the local network 126, management of transmission/reception timings, and the like.

Each functional unit 150 includes a communication slave circuit 160, a functional module 156, and an I/O interface 158.

The communication slave circuit 160 processes frames that are sequentially transmitted through the local network 126. In other words, when a certain frame is received through the local network 126, the communication slave circuit 160 executes data writing and/or data reading for the received frame and then transmits the frame to a functional unit 150 positioned next on the local network 126. The communication slave circuit 160 provides such a frame relay function.

More specifically, the communication slave circuit 160 includes a transmission/reception controller 166, transmission/reception ports 162 and 164, and a state register 168.

Each of the transmission/reception ports 162 and 164 is a part that is physically connected to the local network 126, generates an electric signal in accordance with an instruction from the transmission/reception controller 166 and transmits the generated electric signal onto the local network 126, and converts an electric signal generated on the local network 126 into a digital signal and outputs the converted digital signal to the transmission/reception controller 166.

The transmission/reception controller 166 performs data writing and/or data reading for a frame transmitted on the local network 126. The transmission/reception controller 166 includes a counter synchronized with the transmission/reception controller 122 of the communication master circuit 120 and manages the timing of frame transmission on the local network 126 and the like in accordance with the synchronized counter.

The state register 168 is a register that stores flags representing various states in each functional unit 150. For example, a flag representing the operation mode of the functional unit 150, a flag representing the type of an abnormality occurring in the functional unit 150, a flag representing a communication state of the functional unit 150, and the like are stored in the state register 168.

In addition, when a frame including a special command or the like is received, the transmission/reception controller 166 executes a process designated by the special command included in the received frame. As such a special command, a command for updating a state value stored in the state register 168 may be included. The process according to this embodiment as will be described below is realized using such a special command.

The functional module 156 and the I/O interface 158 are substantially the same as the functional module 256 and the I/O interface 258 illustrated in FIG. 1, and detailed description thereof will not be repeated.

<C. Overview of Power Shutoff Process>

Next, an overview of the process executed in the PLC 1 according to this embodiment will be described. When an event of shutoff of power supply to the CPU unit 100 (particularly, the processor 102) occurs, the CPU unit 100 of the PLC 1 according to this embodiment notifies each functional unit 150 of the shutoff of power supply to the CPU unit 100. Each functional unit 150 that has received this notification executes a process according to the shutoff of power supply to the CPU unit 100. Hereinafter, a series of processes in which the shutoff of power supply to the CPU unit 100 is detected, and a necessary notification is given to each functional unit 150 on the basis of a result of the detection will be collectively referred also to as a "power shutoff process".

FIGS. 3A and 3B are schematic views illustrating an overview of the power shutoff process executed in the PLC 1 according to this embodiment. FIG. 3A schematically illustrates exchange of data between the CPU unit 100 and each functional unit 150. As illustrated in FIG. 3A, input data and output data are exchanged between the CPU unit 100 and each functional unit 150 in a predetermined period.

FIG. 3B schematically illustrates a process executed when power supply to the CPU unit 100 is shutoff. The monitoring circuit 104 of the CPU unit 100 gives a notification for executing the process according to the shutoff of power supply to the CPU unit 100 to one or a plurality of functional units 150 on the basis of detection (power shutoff detection) of the shutoff of power supplied to the CPU unit 100 or reception of a preliminary notification (preliminary notification reception) of shutoff of power supplied to the CPU unit 100. This notification is executed using the communication master circuit 120 (FIG. 2) through the local network 126.

While any implementing form may be employed as long as the notification uses the local network 126 exchanging ordinary input data and output data, in this embodiment, a specific frame (in FIG. 3B, described as a "power shutoff notification frame") including a command associated with the process according to the shutoff of power supply to the CPU unit 100 is transmitted from the communication master circuit 120 through the local network 126. These specific frames are sequentially transmitted to one or a plurality of functional units 150.

As the process according to the shutoff of power supply to the CPU unit 100 that is executed in each functional unit 150, while an arbitrary process may be defined, in this embodiment, the process includes a transition to an operation state limiting the operation of the functional unit 150. In description presented below, the operation state of the functional unit 150 illustrated in FIG. 3A will be referred to as a "normal operation state", and, as illustrated in FIG. 3B, the operation state of the functional unit 150 after the reception of the power shutoff notification frame will be referred to as a "safe operation state". The names of such states are for the convenience of description and thus, are not limited thereto.

Limited operations in the safe operation state may be planned according to the type of the functional unit 150 in advance or may be set in advance by a user. As an example, limited operations in the safe operation state may include a state in which a constant value designated in advance is output by each functional unit 150, or no value is output. In other words, when a state in which the CPU unit 100 cannot execute appropriate control is formed according to the shutoff of power supply to the CPU unit 100, in order to secure safety and/or prevent damage to a machine or a facility that is a control target, the functional unit 150 causes the process to proceed to a state set in advance. Such a state is the safe operation state, and each functional unit 150 transitions to the safe operation state in accordance with an event notification from the CPU unit 100.

In addition, each functional unit 150 has various abnormality detection logics, and, as a part thereof, includes logics for monitoring whether or not the CPU unit 100 that is a connection destination is sound and whether or not communication in the local network 126 is normal. Such abnormality detection logics generate an abnormality log when power supply to the CPU unit 100 is shutoff. When an abnormality log is generated by each functional unit 150, the abnormality log "overflows", and it may cause a problem in operation or maintenance. Thus, another example of the limited operations in the safe operation state may include a process of invalidating such an abnormality detection logic and masking an unnecessary abnormality log. In other words, the limited operations in the safe operation state include the invalidating of a part or all of the abnormality detection logics.

In addition, after each functional unit 150 transitions to the safe operation state, the local network 126 may be invalidated. In other words, by shutting off power supply required for operating the local network 126, a period in which remaining power is supplied to the CPU unit 100 can be extended.

<D. Processing Sequence of Power Shutoff Process>

Figure 4:
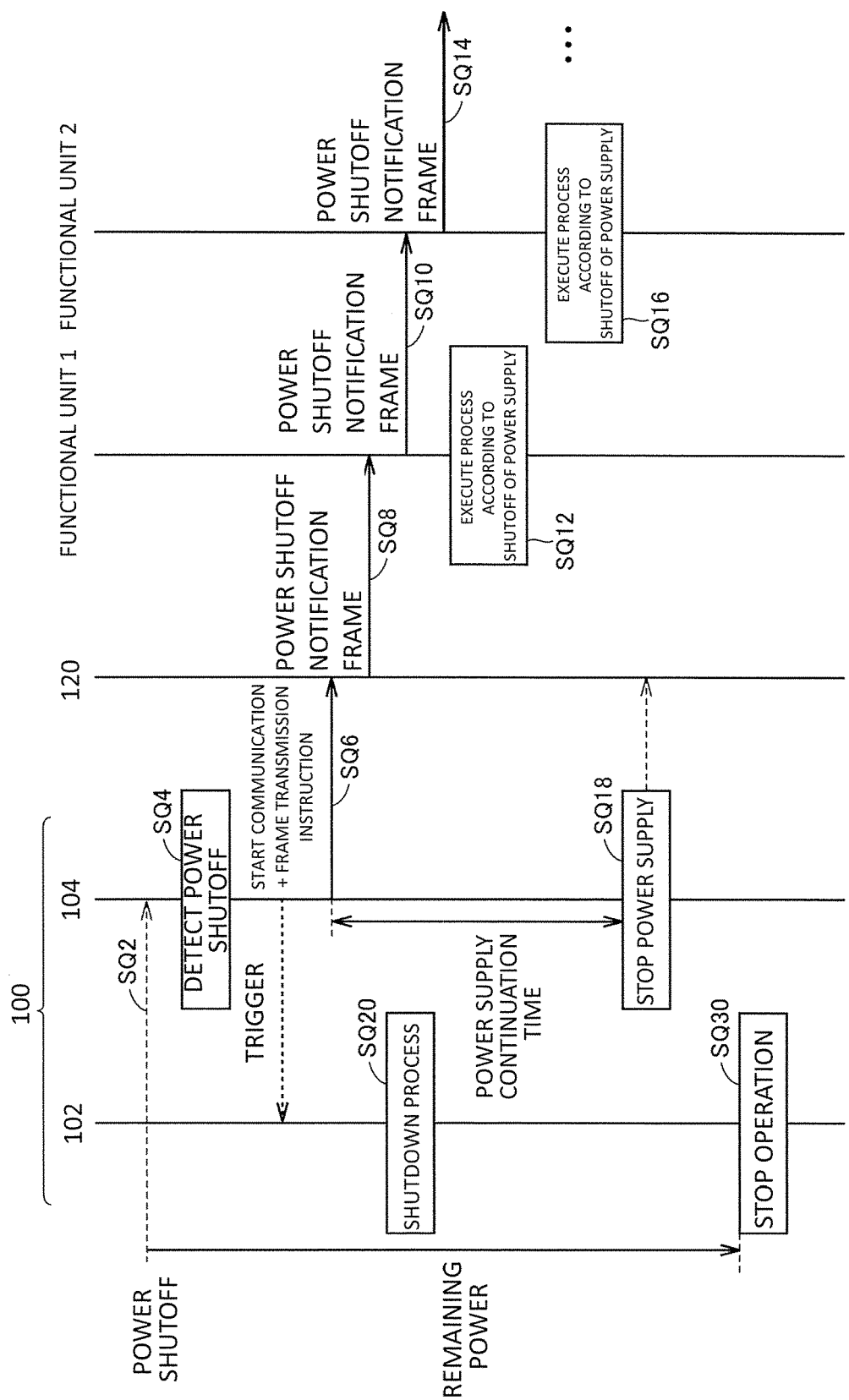
FIG. 4 is a sequence diagram illustrating the processing sequence of a power shutoff process provided by a PLC according to this embodiment.

Next, the processing sequence of the power shutoff process provided by the PLC 1 according to this embodiment will be described. FIG. 4 is a sequence diagram illustrating the processing sequence of the power shutoff process provided by the PLC 1 according to this embodiment. FIG. 4 illustrates the processing sequence of the power shutoff process executed in the PLC 1 formed by the CPU unit 100 and a plurality of functional units 150 (in the example illustrated in FIG. 4, for the convenience of description, two functional units) illustrated in FIG. 2.

When the shutoff of power supplied to the CPU unit 100 occurs (Sequence SQ2), the monitoring circuit 104 of the CPU unit 100 detects the power shutoff (Sequence SQ4). Then, the monitoring circuit 104 directs the communication master circuit 120 to start communication and to transmit a frame (power shutoff notification frame) registered in the monitoring circuit 104 in advance (Sequence SQ6).

In accordance with this direction, the communication master circuit 120 transmits the power shutoff notification frame to one or a plurality of functional units 150 through the local network 126 (Sequence SQ8).

When a power shutoff notification frame is received from the upstream side, the functional unit 150 (the "functional unit 1" illustrated in FIG. 4) arranged at a position closest to the communication master circuit 120 in the local network 126 transmits the received power shutoff notification frame to the downstream side (Sequence SQ10) and executes a process (for example, a transition to the safe operation state as described above) according to the shutoff of power supply to the CPU unit 100 (Sequence SQ12).

Similarly, the next functional unit 150 (the "functional unit 2" illustrated in FIG. 4) that has received the transmitted power shutoff notification frame transmits the received power shutoff notification frame to the side further downstream (Sequence SQ14) and executes the process according to the shutoff of power supply to the CPU unit 100 (Sequence SQ16).

Hereinafter, the reception of the power shutoff notification frame from the upstream side and transmission of the received power shutoff notification frame to the downstream side, and the execution of the process according to the shutoff of power supply to the CPU unit 100 are performed in each functional unit 150.

Then, after the elapse of a predetermined time (power supply continuation time) from directing the communication master circuit 120 to start communication, the monitoring circuit 104 stops the power supply to the communication master circuit 120 (Sequence SQ18). The stopping of the power supply to the communication master circuit 120 may be realized by using a method of turning off a switch disposed in a power supply path for the communication master circuit 120 or giving a shutdown instruction to the communication master circuit 120. In this way, after the transmission of the specific frame (power shutoff notification frame), the monitoring circuit 104 shuts off the power consumption of the communication master circuit 120.

It is preferable to set the time (power supply continuation time) until the shutoff of the power consumption of the communication master circuit 120 to a time required for the power shutoff notification frame to be transmitted to all the functional units 150 connected to the local network 126 or longer. For example, the time may be set in advance according to a maximum number of functional units 150 that can be connected to the local network 126 or may be dynamically set according to the number of functional units 150 connected to the local network 126.

In addition, on condition that a reception response for the power shutoff notification frame is received from a functional unit 150 connected to the end of the local network 126 by the communication master circuit 120, the power consumption of the communication master circuit 120 may be shut off.

Meanwhile, when the power shutoff is detected by receiving a trigger of power shutoff detection from the monitoring circuit 104, the processor 102 executes a shutdown process in which data on a nonvolatile memory and data representing the current state are saved (Sequence SQ20). This shutdown process is executed while power supply using the remaining power from the power supply unit 130 is maintained. Then, when the power supply from the power supply unit 130 is cut off, or when the supplied power is a defined voltage value or less, the processor 102 stops the operation (Sequence SQ30).

By executing this series of the power shutoff process, each functional unit 150 transitions to the safe operation state. Accordingly, after the power supply to the CPU unit 100 is recovered, a situation in which one or a plurality of functional units 150 generates a large amount of abnormality logs can be avoided.

<E. Method of Detecting Power Shutoff>

Figure 5A:
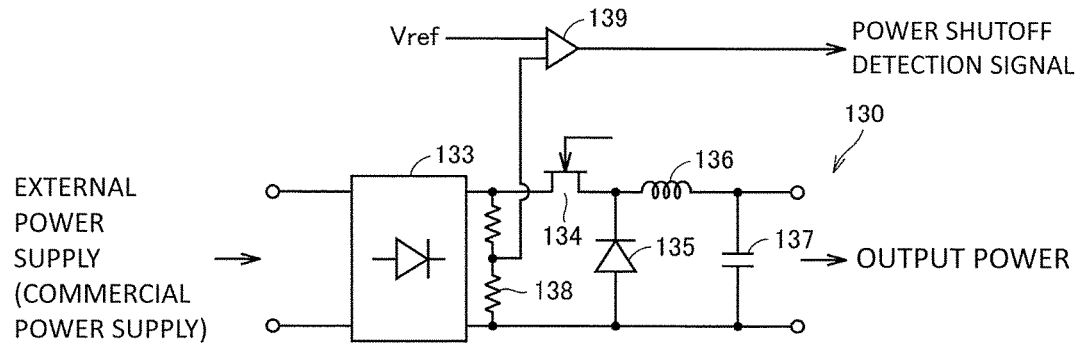
FIGS. 5A and 5B are schematic views illustrating an example of a method of detecting power shutoff in a CPU unit of a PLC according to this embodiment.
Figure 5B:
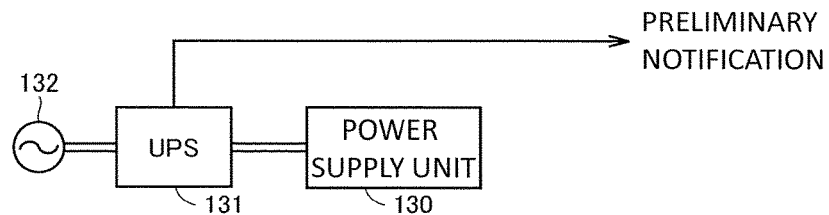

Next, an example of the method of detecting power shutoff using the monitoring circuit 104 of the CPU unit 100 will be described. FIGS. 5A and 5B are schematic views illustrating an example of the method of detecting power shutoff in the CPU unit 100 of the PLC 1 according to this embodiment.

FIG. 5A illustrates an example of the configuration of a case where shutoff of power is detected on the basis of the supply state of an external power supply for the power supply unit 130 as an example of the method of detecting shutoff of power supplied to the CPU unit 100. The power supply unit 130 illustrated in FIG. 5A includes an AC-to-DC conversion circuit that receives AC power from an external power supply such as a commercial power supply and outputs DC power. More specifically, the power supply unit 130 includes a rectification unit 133, a switching unit 134, a diode 135, an inductor 136, and a capacitor 137. The switching unit 134, the diode 135, the inductor 136, and the capacitor 137 configure one kind of a switching regulator. In other words, according to a switching operation in the switching unit 134 including a field effect transistor or the like, DC power having a predetermined voltage is output.

For example, by disposing a voltage-dividing resistor 138 on the output side of the rectification unit 133 of the power supply unit 130 and comparing an electric potential generated in the voltage-dividing resistor 138 with a reference electric potential Vref by using a comparator 139, the shutoff of power supply from the external power supply can be detected. In other words, by appropriately setting the reference electric potential Vref, when the power supply from the external power supply is shut off for any reason, the electric potential generated in the voltage-dividing resistor 138 is lowered to be below the reference electric potential Vref. In this state, the comparator 139 outputs a power shutoff detection signal. The monitoring circuit 104 of the arithmetic operation processing unit 101 can detect shutoff of power supplied to the CPU unit 100 on the basis of the power shutoff detection signal being output.

In addition, the comparator 139 illustrated in FIG. 5A may be configured to be included in the monitoring circuit 104 of the arithmetic operation processing unit 101.

In FIG. 5A, while the method of detecting shutoff of the supplied power by measuring a voltage or electric potential that is actually generated according to the example of the configuration of the power supply unit 130 has been illustrated as an example, the configuration is not limited thereto, and an arbitrary circuit configuration and an arbitrary detection circuit may be employed.

FIG. 5B illustrates, as an example of a method of receiving a preliminary notification before shutoff of power supplied to the CPU unit 100, an example of the configuration of a case where a preliminary notification is received from an uninterruptable power supply (UPS) device supplying an external power to the power supply unit 130. As illustrated in FIG. 5B, in the configuration in which power from the external power supply 132 is supplied to the power supply unit 130 through the UPS device 131, even when power supply from the external power supply 132 is shutoff, the power supply to the power supply unit 130 is not instantaneously shut off. However, since there is a limit on the power amount secured using a battery built into the UPS device 131, usually, when the UPS device 131 detects shutoff of power supply from the external power supply 132, a preliminary notification representing that power supply to the power supply unit 130 is to be shutoff within a predetermined time is output. The monitoring circuit 104 of the arithmetic operation processing unit 101 receives this preliminary notification and starts the execution of the power shutoff process as described above.

In FIG. 5B, while an example in which a preliminary notification is received from the UPS device is illustrated as a typical example, the method is not limited thereto, and a preliminary notification before the shutoff of power supplied to the CPU unit 100 may be received using an arbitrary method.

<F. Process According to Shutoff of Power Supply to CPU Unit>

Next, the process according to the shutoff of power supply to the CPU unit 100, which is executed in each functional unit 150, will be described.

(f1: Transition of Operation State)

As the process according to the shutoff of power supply to the CPU unit 100, a process causing the operation state of each functional unit 150 to transition from the "normal operation state" to the "safe operation state" may be conceived. In other words, the monitoring circuit 104 of the CPU unit 100 gives an instruction for a transition from the "normal operation state" to the "safe operation state" to each functional unit 150, and each functional unit 150 receives this instruction and causes the transition of the operation state. According to the transition of the operation state, each functional unit 150 outputs an output value set in advance to a machine or a facility that is a control target and/or invalidates all or a part of the abnormality detection logics.

In other words, when a power shutoff notification frame is received, one or a plurality of functional units 150 executes a process of causing the operation state to transition from the "normal operation state" to the "safe operation state", and, as a result, each functional unit 150 executes the process according to the stopping of the operation of the CPU unit 100.

Figure 6A:
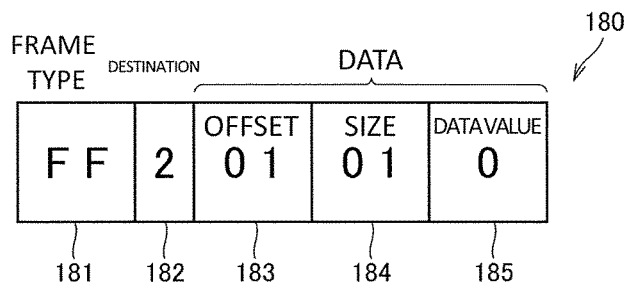
FIGS. 6A and 6B are schematic views describing a power shutoff notification frame used in a PLC according to this embodiment and the processing contents thereof.
Figure 6B:
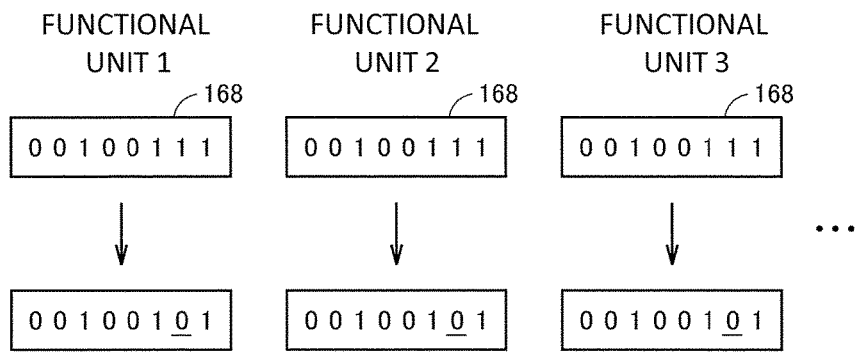

FIGS. 6A and 6B are schematic views describing a power shutoff notification frame used in the PLC 1 according to this embodiment and the processing content thereof.

FIG. 6A illustrates an example of the data structure of the power shutoff notification frame 180. The power shutoff notification frame 180 includes a data type section 181 and a destination designation section 182 as a header section and includes an offset section 183, a size section 184, and a data value section 185 as a data main body section.

The data type section 181 is an area in which a value representing the type of a frame is stored, and, in the example illustrated in FIG. 6A, a value representing a frame to execute a designated command in the functional unit 150 that has received the frame is stored. The destination designation section 182 is an area in which a value representing the transmission destination of the frame is stored. In the destination designation section 182, an address on the network is designated in the case of unicast, information representing a plurality of transmission destinations is designated in the case of multicast, and a specific value is designated in the case of broadcast.

In the data main body section of the frame illustrated in FIG. 6A, a command for writing data is stored. More specifically, an offset value representing the start position of an area in which data is written is stored in the offset section 183, the size of an area in which data is written is stored in the size section 184, and the value of actual write data is stored in the data value section 185.

FIG. 6B illustrates an example of the state register 168 included in the communication slave circuit 160 of each functional unit 150. In the PLC 1 according to this embodiment, each functional unit 150 executes setting of an operation state, a determination of presence/absence of an abnormality, or the like in accordance with the value of the flag set in the state register 168. In the example illustrated in FIG. 6B, a second bit (second bit from the right side) from the low rank of the state register 168 illustrates the operation state of each functional unit 150.

When the power shutoff notification frame 180 illustrated in FIG. 6A is received, each functional unit 150 updates the content of the state register 168 in accordance with a command included therein. In the example illustrated in FIG. 6B, in each functional unit 150, the second bit from the low rank of the state register 168 is updated. Accordingly, each functional unit 150 causes the operation state to transition from the "normal operation state" to the "safe operation state".

In this way, the power shutoff notification frame that is a specific frame is a frame used for causing each functional unit 150 to transition to the "safe operation state", and, when the power shutoff notification frame is received, each functional unit 150 changes the value of the flag representing the operation state. Each functional unit 150 transitions to the "safe operation state", thereby executing the process according to the shutoff of power supply to the CPU unit 100.

As illustrated in FIGS. 6A and 6B, by using the power shutoff notification frame used for updating the value of the flag representing the operation state of each functional unit 150, the configuration or and the process of the power shutoff notification frame transmitted from the monitoring circuit 104 of the CPU unit 100 can be simplified, and each functional unit 150 executes the process defined as the safe operation state, and accordingly, the process of each functional unit 150 does not need to be managed on the CPU unit 100 side. In other words, since the process at the time of shutoff of the power supply to the CPU unit 100 does not need to be managed on the CPU unit 100 side, the design and the maintenance of the system can be easily executed.

(f2: Individual Designation)

In FIGS. 6A and 6B, while an example in which the power shutoff notification frame for changing the value of the flag of the state register 168 is used has been described, the power shutoff notification frame may include a command targeted only for specific functional units 150 and/or a command for executing a specific process.

For example, a command used for masking an unnecessary abnormality log may be given only to functional units 150 of a specific type among a plurality of functional units 150 connected to the local network 126. For example, the communication unit or the like may constantly monitor the communication states of a higher rank network and a lower rank network, and accordingly, there is a possibility that a large amount of abnormality logs may be generated according to the shutoff of power supply to the CPU unit 100. For this reason, an instruction for invaliding abnormality detection logics may be given only to the functional units 150 of such a specific type.

In addition, examples of the process according to the shutoff of power supply to the CPU unit 100 include (1) setting of an output signal from the functional unit 150 to a value set in advance and (2) invalidating of all or a part of the abnormality detection logics, and such a process may be specifically designated. For example, all the output signals from the functional units 150 connected to the local network 126 may be set to False (Off or "0"), in other words, in a system configuration in which only setting of a load shutoff output is necessary, a power shutoff notification frame including an instruction for setting the output signal to False may be transmitted to all the functional units 150.

By including an instruction for each functional unit 150 in the power shutoff notification frame, the process corresponding to a machine or a facility that is a control target can be executed safely.

<G. Pre-Registration of Power Shutoff Notification Frame>

As described above, an arbitrary power shutoff notification frame may be configured to be transmitted. In order to increase the degree of freedom of the power shutoff notification frame to be transmitted, by executing a system program 108 (a kind of firmware) using the processor 102 at the time of system start-up or the like, a power shutoff notification frame to be transmitted by the monitoring circuit 104 may be set.

Figure 7A:
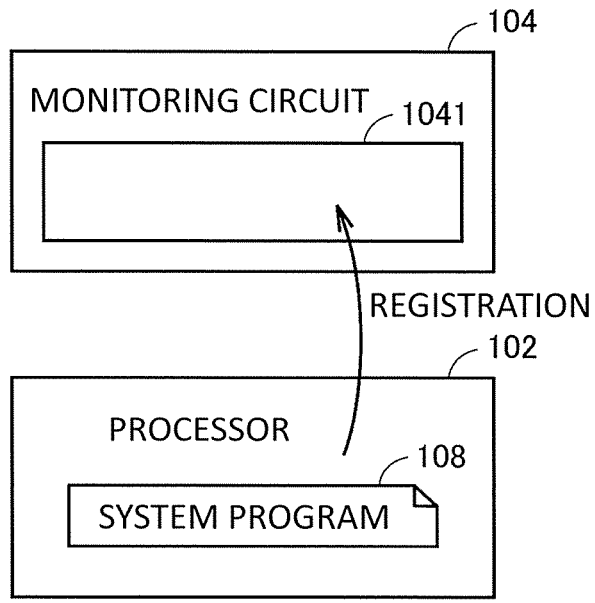
FIGS. 7A and 7B are schematic views describing a process relating to pre-registration of a power shutoff notification frame in a PLC according to this embodiment.
Figure 7B:
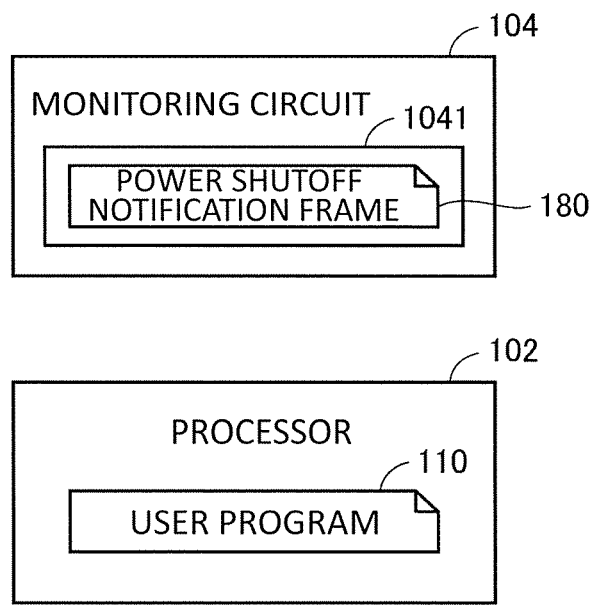

FIGS. 7A and 7B are schematic views describing a process relating to pre-registration of a power shutoff notification frame in the PLC 1 according to this embodiment. As illustrated in FIG. 7A, when the CPU unit 100 starts to operate, the processor 102 executes the system program 108. According to the execution of the system program 108, an environment for executing the user program 110 is formed.

As a part of the system program 108, a process of registering the power shutoff notification frame 180 in a register 1041 of the monitoring circuit 104 is included.

As illustrated in FIG. 7B, in a state in which the power shutoff notification frame 180 is pre-registered in the register 1041 of the monitoring circuit 104, the processor 102 executes the user program 110, and the monitoring circuit 104 monitors shutoff of power supply to the CPU unit 100. In this way, the processor 102 executes the system program 108 (or firmware), whereby a specific frame (power shutoff notification frame) transmitted from the communication master circuit 120 is pre-registered before the start of execution of the user program 110.

As described above, when shutoff of power supply to the CPU unit 100 is detected, the monitoring circuit 104 transmits the power shutoff notification frame 180 that is registered in advance from the communication master circuit 120.

As above, the monitoring circuit 104 that is a hardware logic has a function of transmitting a specific frame (power shutoff notification frame) in addition to the function of detecting shutoff of power supply. This specific frame is registered in advance by the system program 108 executed by the processor 102.

In this embodiment, an arbitrary communication frame can be registered in the register 1041 of the monitoring circuit 104 by using the system program 108 executed by the processor 102. For this reason, an arbitrary communication frame may be registered according to the configuration, the use, and the like of the PLC 1.

For example, the content of the power shutoff notification frame may be changed according to the number of functional units 150 connected to the local network 126. Alternatively, as described above, the process may be executed only for specific functional units 150, or the functional units 150 may be caused to execute only a specific process.

In the CPU unit 100 according to this embodiment, by using hardware logics for the function of detecting shutoff of power supply and the function of transmitting a power shutoff notification frame, an increase in speed is realized, and, by employing a configuration in which the content of the power shutoff notification frame can be arbitrarily set by the system program 108, a system having a high degree of freedom can be realized.

<H. Other Application Examples>

In the description presented above, a configuration in which a specific frame (power shutoff notification frame) is transmitted to one or a plurality of functional units 150 connected to the CPU unit 100 through the local network 126 has been mainly described. However, a similar scheme may be applied also to one or a plurality of functional units 150 connected through a field network.

Figure 8:
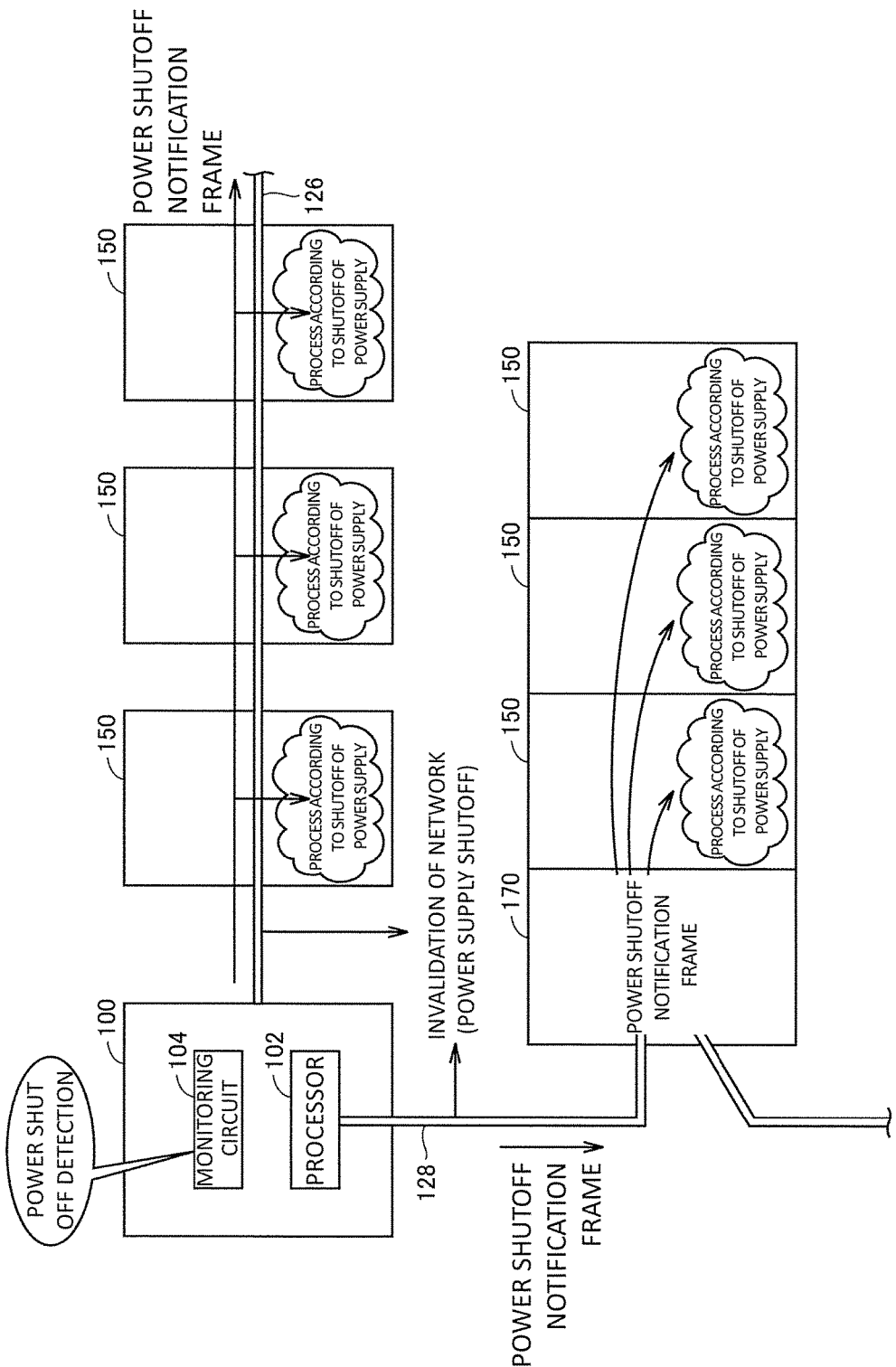
FIG. 8 is a schematic view illustrating the configuration of another main part of a PLC according to this embodiment.

FIG. 8 is a schematic view illustrating the configuration of another main part of a PLC according to this embodiment. As illustrated in FIG. 8, a CPU unit 100 of a PLC 1 is connected to one or a plurality of functional units 150 through a local network 126 and is also connected to a remote I/O device (a communication coupler unit 170 and one or a plurality of functional units 150) through a field network 128.

Also in such a configuration, when shutoff of power supplied to the CPU unit 100 is detected, the monitoring circuit 104 of the CPU unit 100 transmits a power shutoff notification frame through the local network 126 and transmits a power shutoff notification frame through the field network 128. In response to these power shutoff notification frames, each of one or a plurality of functional units 150 connected to the local network 126 and each of one or a plurality of functional units 150 connected to the field network 128 execute the process according to the shutoff of power supply to the CPU unit 100.

In this way, the power shutoff process according to this embodiment can be applied to not only the functional units 150 connected to the CPU unit 100 through the local network 126 but also functional units 150 connected through the field network 128.

For the convenience of description, while the CPU unit 100 including both the local network 126 and the field network 128 is illustrated as an example in FIG. 8, a CPU unit 100 including only the field network 128 may be similarly applied.

<I. Advantages>

According to the CPU unit 100 according to this embodiment, when power supplied to the CPU unit 100 is shutoff, a specific frame (power shutoff notification frame) can be transmitted to one or a plurality of functional units 150 through a communication line through which input data and output data are exchanged. According to this power shutoff notification frame, each functional unit 150 executes the process according to the shutoff of power supply to the CPU unit 100. By employing such a configuration, as illustrated in FIG. 1, a dedicated line used for giving a notification of an event is not necessary, and a low cost can be realized. In addition, since a dedicated line is not necessary, even in a case where a fixed-period network employing a general communication protocol or the like is employed, the process according to the shutoff of power supply to the CPU unit 100 can be executed in each functional unit 150.

According to the CPU unit 100 according to this embodiment, the function of detection of shutoff of power supply and the function of transmitting a power shutoff notification frame are realized using hardware logics, and accordingly, a time required for executing a necessary process in each functional unit 150 or transitioning to a required operation state after the shutoff of supplied power occurs can be shortened. In addition, compared to a case where shutoff of power supply is detected using a processor or the like, a time fluctuation required for the detection process can be decreased. In accordance with the shortening of the time and the decrease in the time fluctuation, a power supply capacity to be secured by the power supply unit 130 can be decreased, and a low cost of the power supply unit 130 can be achieved.

According to the CPU unit 100 according to this embodiment, after the shutoff of power supply is detected, the content of the power shutoff notification frame transmitted to each functional unit 150 is configured to be arbitrarily set by the system program 108, whereby a system having a high degree of freedom can be realized.

According to the CPU unit 100 according to this embodiment, when shutoff of the power supply is detected, the monitoring circuit 140 may simply transmit the power shutoff notification frame used for causing the operation state of each functional unit 150 to transition, and, after the power supply to the CPU unit 100 is shut off, the process executed by each functional unit 150 can be set in advance for each functional unit 150. In other words, a special communication frame used for directing the operation of each functional unit 150 does not need to be prepared in advance, and the system can be simplified.

In the PLC 1 according to this embodiment, each functional unit 150 constantly monitors time-out of the transmission/reception of a communication frame exchanged with the CPU unit 100, and, according to the occurrence of this time-out, the CPU unit 100 being down can be detected.

Also in such a case, each functional unit 150 causes the operation state to transition and executes the process according to the shutdown of power supply to the CPU unit 100. However, according to a method that is based on the monitoring of time-out, a detection time is not shorter than the transmission period of the communication frame, and, as a result, a necessary process cannot be completed before the stopping of the operation of the CPU unit 100. In addition, a fluctuation may occur also in the timing at which the shutoff of the power supply is detected.

In contrast to this, by transmitting a specific frame (power shutoff notification frame) as described above, each functional unit 150 can be immediately aware of the shutoff of the power supply to the CPU unit 100, and accordingly, the process according to the shutoff of the power supply to the CPU unit 100 can be immediately started. Particularly, in a case where a total number of functional units 150 connected to a same network is large or the like, the frame period becomes long, and a relatively long time is necessary until the down of the CPU unit 100 is detected, such a problem does not occur.

In the PLC 1 according to this embodiment, by transmitting a specific frame (power shutoff notification frame), each functional unit 150 invalidates a part or all the abnormality detection logics, and accordingly, when the CPU unit 100 is restored or the like, a situation in which abnormality logs overflow can be avoided.

The embodiments described here should be considered not to be limiting but to be exemplary in every aspect. The scope of the present invention is represented not by the description presented above but by the claims and is intended to include meanings equivalent to and modifications thereof within the scope of the claims.

What is claimed is:

1. An arithmetic operation device configuring a control apparatus, the arithmetic operation device comprising:
   a communication circuit that is used for exchanging data with one or a plurality of functional units through a communication line;
   a processor that is used for executing a user program executing at least one of an arithmetic operation process and a generating process, the arithmetic operation process uses data acquired from the one or the plurality of functional units, the generating process transmits data to the one or the plurality of functional units; and
   a monitoring circuit that is connected to the communication circuit and the processor,
   wherein the monitoring circuit gives a notification to the one or the plurality of functional units through the communication circuit on the basis of at least one of detection of shutoff of power supplied to the arithmetic operation device and reception of a preliminary notification before the shutoff of the power supplied to the arithmetic operation device, and the notification is used for executing a process according to shutoff of power supply to the arithmetic operation device,
   wherein a specific frame including a command associated with the process according to the shutoff of the power supply to the arithmetic operation device is transmitted from the communication circuit through the communication line, and the specific frame is sequentially transmitted to the one or the plurality of functional units.

2. The arithmetic operation device according to claim 1, wherein the process according to the shutoff of the power supply to the arithmetic operation device includes a transition to an operation state in which an operation of each functional unit is limited.

3. The arithmetic operation device according to claim 1, wherein, when the specific frame is received, each of the one or the plurality of functional units changes a value of a flag representing an operation state.

4. The arithmetic operation device according to claim 1, wherein the processor pre-registers the specific frame transmitted from the communication circuit before start of execution of the user program by executing a program.

5. The arithmetic operation device according to claim 1, wherein the monitoring circuit shuts off power consumption of the communication circuit after the transmission of the specific frame.

6. The arithmetic operation device according to claim 1, further comprising a power supply section that supplies power to the arithmetic operation device,
 wherein the monitoring circuit detects shutoff of power on the basis of a supply state of an external power supply for the power supply section.

7. The arithmetic operation device according to claim 1, further comprising a power supply section that supplies power to the arithmetic operation device,
 wherein the monitoring circuit receives the preliminary notification from an UPS device supplying an external power to the power supply section.

8. The arithmetic operation device according to claim 1, wherein the monitoring circuit is implemented using an FPGA or an ASIC.

9. A control apparatus comprising:
 an arithmetic operation device; and
 one or a plurality of functional units,
 wherein the arithmetic operation device includes:
  a communication circuit that is used for exchanging data with the one or the plurality of functional units through a communication line;
  a processor that is used for executing a user program executing at least one of an arithmetic operation process and a generating process, the arithmetic operation process uses data acquired from the one or the plurality of functional units, the generating process transmits data to the one or the plurality of functional units; and
  a monitoring circuit that is connected to the communication circuit and the processor,
  wherein the monitoring circuit gives a notification circuit to the one or the plurality of functional units through the communication circuit on the basis of at least one of detection of shutoff of power supplied to the arithmetic operation device and reception of a preliminary notification before the shutoff of the power supplied to the arithmetic operation device, and the notification is used for executing a process according to shutoff of power supply to the arithmetic operation device,
  wherein a specific frame including a command associated with the process according to the shutoff of the power supply to the arithmetic operation device is transmitted from the communication circuit through the communication line, and the specific frame is sequentially transmitted to the one or the plurality of functional units.

10. An arithmetic operation device configuring a control apparatus, the arithmetic operation device comprising:
 a communication circuit that is used for exchanging data with one or a plurality of functional units through a communication line;
 a processor that is used for executing a user program executing at least one of an arithmetic operation process and a generating process, the arithmetic operation process uses data acquired from the one or the plurality of functional units, the generating process transmits data to the one or the plurality of functional units;
 a monitoring circuit that is connected to the communication circuit and the processor,
  wherein the monitoring circuit gives a notification to the one or the plurality of functional units through the communication circuit on the basis of at least one of detection of shutoff of power supplied to the arithmetic operation device and reception of a preliminary notification before the shutoff of the power supplied to the arithmetic operation device, and the notification is used for executing a process according to shutoff of power supply to the arithmetic operation device; and
 a power supply section that supplies power to the arithmetic operation device,
  wherein the monitoring circuit receives the preliminary notification from an UPS device supplying an external power to the power supply section.

* * * * *